H. I. MATSON.
WHEEL HOLDER.
APPLICATION FILED MAR. 9, 1920.
1,407,332.
Patented Feb. 21, 1922.
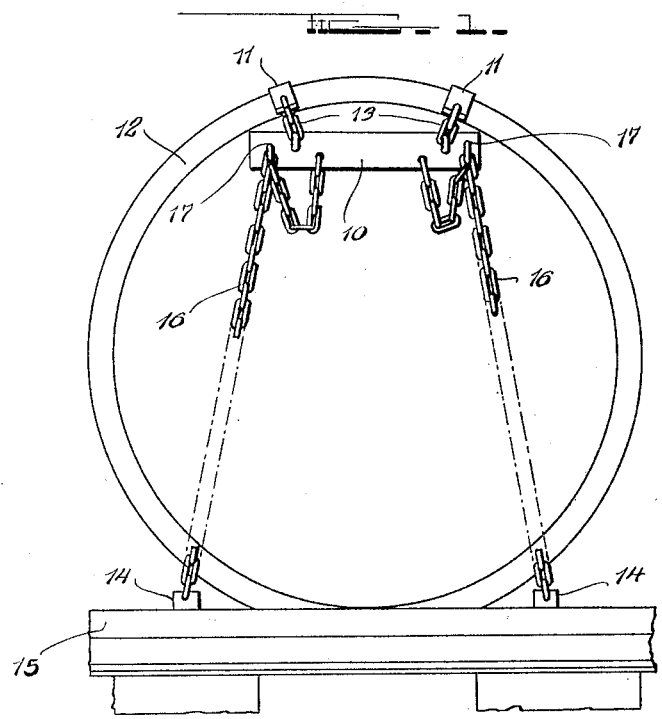
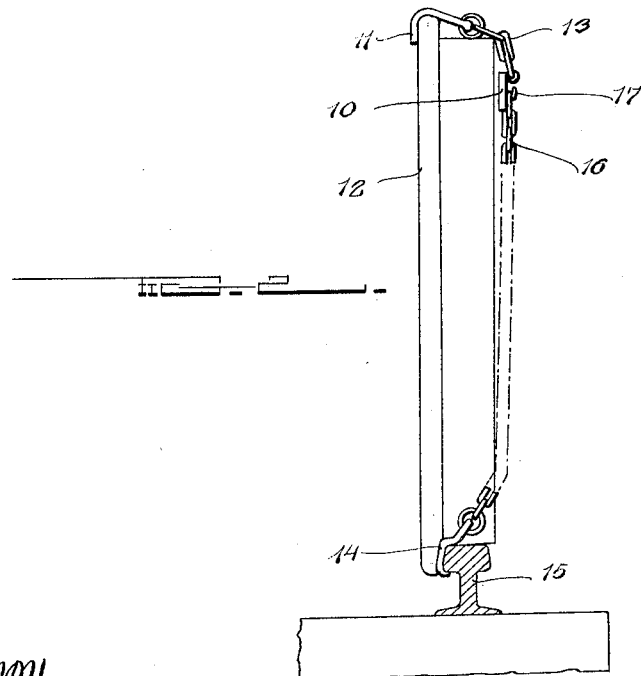
H. I. Matson
INVENTOR
BY Victor J. Evans
ATTORNEY
WITNESS:

UNITED STATES PATENT OFFICE.

HENRY I. MATSON, OF ASTORIA, OREGON.

WHEEL HOLDER.

1,407,332.

Specification of Letters Patent. Patented Feb. 21, 1922.

Application filed March 9, 1920. Serial No. 364,474.

*To all whom it may concern:*

Be it known that I, HENRY I. MATSON, a citizen of the United States, residing at Astoria, in the county of Clatsop and State of Oregon, have invented new and useful Improvements in Wheel Holders, of which the following is a specification.

The object of the invention is to provide a simple and effective means for holding a car wheel in position upon the track rail in the operation of jacking up the journal box of a railway car for the purpose of adjusting or replacing the brasses or in repacking the journal box or in performing similar operations in connection with cars and their journal boxes, and for which purpose it is common to use crow-bars or pry-bars and in the performance of which operation a certain amount of risk is ordinarily involved, and which frequently cause injury one way or another to the workman or the attendants, and with this object in view the invention consists in a construction and combination of parts of which a preferred embodiment is shown in the accompanying drawings, wherein—

Figure 1 is a side view of the apparatus applied in the operative position to a car wheel.

Figure 2 is an end or edge elevation of the same.

The apparatus consists essentially of an equalizing bar 10, with which are connected the flanged hooks 11 adapted for engagement with the wheel flange 12 and which are respectively connected with the equalizing bar by means of chains or cables 13, and rail hooks or clamps 14 adapted for engagement with the head of a rail 15 and also connected with the bar 10 by means of the chains or cables 16. The attachment of the rail clamp connections 16 with the equalizing bar and the attachment of the flange hook or clamp connections 13 with said bar are respectively at spaced points, so that when the device is applied to the wheel as indicated in Figure 1, the bar occupies a substantially horizontal position adjacent to the plane of the outer surface of the wheel with the chains 13 extending over the tread of the wheel, and the chains 16 extending under the tread of the wheel adjacent to the plane of the rail and respectively in front and in rear of the bearing of the wheel on the track rail, so as to enable the clamp 14 to engage with the edges of the rail heads at their inner sides.

In order to adapt the device for use in connection with wheels of different diameters, a means of adjustment for the connections 16 is provided, the same consisting of hooks 17 also carried by the equalizing bar and adapted for engagement with the proper links of a chain forming said connections 16 to the end that after having engaged the clamps 14 with the rail tread or head, the slack in the chains 16 may be taken up to insure a proper downward holding effect of the device upon the wheel during the jacking up of the journal box to loosen the brasses or other bearing elements.

It will be obvious from the foregoing description that the apparatus may be applied instantly to the wheel of which the journal box is to be adjusted, the clamps 11 and 14 respectively engaging the wheel flange and rail head without the employment of any securing means and serving to effectively retain the wheel upon the track rail during the elevation of the journal box.

Moreover whereas in the drawing and description the hooks 14 are set forth as being engaged with the rail, it will be obvious that engagement may be made thereby with any other convenient fixed object which will serve to prevent the rising of the wheel from the bearing on the rail tread, such as the edge of the jack block when such device is employed in this connection.

Having described the invention what is claimed:

1. An apparatus for the purpose described having an equalizing bar, wheel flange clamps flexibly connected with the bar, rail engaging clamps flexibly connected with the bar, and means for adjusting the effective length of the connections between said bar and the rail engaging clamps.

2. An apparatus for the purpose described having an equalizing bar, wheel flange clamps flexibly connected with the bar, rail clamps flexibly connected with the bar by means of chains, and hooks carried by the bar for engagement with the links of said chains to determine the effective length of the latter.

In testimony whereof I affix my signature.

HENRY I. MATSON.